United States Patent
Wakao et al.

(10) Patent No.: US 6,842,682 B2
(45) Date of Patent: Jan. 11, 2005

(54) DRIVING FORCE DISTRIBUTION METHOD AND APPARATUS

(75) Inventors: Hisaaki Wakao, Kariya (JP); Kiyoshige Kato, Aichi-ken (JP); Satomi Ito, Toyota (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/420,892

(22) Filed: Apr. 23, 2003

(65) Prior Publication Data

US 2004/0019421 A1 Jan. 29, 2004

(30) Foreign Application Priority Data

Apr. 23, 2002 (JP) ........................................ 2002-120134

(51) Int. Cl.$^7$ ................................................ G06F 7/00

(52) U.S. Cl. ........................................................ 701/69

(58) Field of Search ............................. 701/36, 51, 63, 701/65, 69, 71–76, 80–82, 88–92, 94; 180/197, 233

(56) References Cited

U.S. PATENT DOCUMENTS 5,159,990 A  *  11/1992  Abe et al. .................... 180/197
5,950,597 A  *   9/1999  Kamio et al. ................ 123/397

* cited by examiner

*Primary Examiner*—Thu V. Nguyen
(74) *Attorney, Agent, or Firm*—Oblon, Spivak, McClelland, Maier & Neustadt, P.C.

(57) ABSTRACT

The four-wheel-drive vehicle has a torque transmission device configured to distribute torque transmitted from an engine to a first set of wheels to a second set of wheels. Throttle-opening of the engine is detected. A first torque command which depends on the throttle-opening is obtained. A rotational speed difference between the first set of wheels and the second set of wheels is detected. A second torque command which depends on the rotational speed difference is obtained. The torque transmission device is controlled based on the first and the second torque command so as to transmit the driving force to the second set of wheels according to the throttle-opening and the rotational speed difference. Then, a signal that corresponds to the throttle-opening is monitored. When the signal is judged being abnormal, the first torque command is ignored so that the torque transmission device is controlled based on the second torque command.

17 Claims, 6 Drawing Sheets

DRIVING FORCE DISTRIBUTION METHOD AND APPARATUS

INCORPORATION BY REFERENCE

The present application claims priority under 35 U.S.C. §119 to Japanese Patent Application No. 2002-120134, filed on Apr. 23, 2002. The contents of that application are incorporated herein by reference in their entirety.

BACKGROUND OF THE INVENTION

1. Field of the Invention

This invention relates to a driving force distribution method and a driving force distribution apparatus for four-wheel-drive vehicle that has a torque transmission device.

2. Discussion of the Background

At a four-wheel-drive vehicle of recent years, front wheels are always driven, and rear wheels are selectively driven depending on its necessity by arranging a torque transmission device on the way of a propeller shaft that connects an engine and the rear wheels. Such torque transmission device is controlled so as to transmit torque to the rear wheels, which is calculated based on rotational speed differences between the front and the rear wheels, for instance. As for a fail-safe of the torque transmission device, if some abnormality happens, the torque transmission device is controlled not to transmit any torque, i.e. the vehicle becomes a two-wheel-drive. However, it is possible that the vehicle sticks if the abnormality happens when the vehicle is on a rough road such as snow-covered road, because of two-wheel-drive.

SUMMARY OF THE INVENTION

In view of the foregoing, it is an object of the present invention to provide an improved driving force distribution method and apparatus. In order to achieve the above and other objects, a driving force distribution method for a four-wheel-drive vehicle is provided as a first aspect of the present invention. The four-wheel-drive vehicle has a torque transmission device configured to distribute torque transmitted from an engine to a first set of wheels to a second set of wheels. Throttle-opening of the engine is detected. A first torque command which depends on the throttle-opening is obtained. A rotational speed difference between the first set of wheels and the second set of wheels is detected. A second torque command which depends on the rotational speed difference is obtained. The torque transmission device is controlled based on the first torque command and the second torque command so as to transmit the driving force to the second set of wheels according to the throttle-opening and the rotational speed difference. Then, a signal that corresponds to the throttle-opening is monitored. When the signal is judged being abnormal, the first torque command is ignored so that the torque transmission device is controlled based on the second torque command.

A driving force distribution apparatus is provided as a second aspect of the present invention. The driving force distribution apparatus for a four-wheel-drive vehicle has a torque transmission device configured to distribute torque transmitted from an engine to a first set of wheels to a second set of wheels. The apparatus comprises a throttle sensor, plural speed sensors and an electrical control unit. The throttle sensor detects throttle-opening of the engine. The speed sensors detect rotational speed of the first set of wheels and the second set of wheels. The electrical control unit determines a first torque command which depends on the throttle-opening detected by the throttle sensor and a second torque command which depends on a rotational speed difference between the first set of wheels and the second set of wheels detected by the each speed sensor. The electrical control unit controls the torque transmission device based on the first torque command and the second torque command so as to transmit the driving force to the second set of wheels according to the throttle-opening and the rotational speed difference. Then, the electrical control unit monitors a signal which is detected by the throttle sensor, and when the signal judged being abnormal the first torque command is ignored so that the torque transmission device is controlled based on the second torque command.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments according to the present invention will be explained hereinafter with reference to the drawings.

[First Embodiment]

Figure 1:
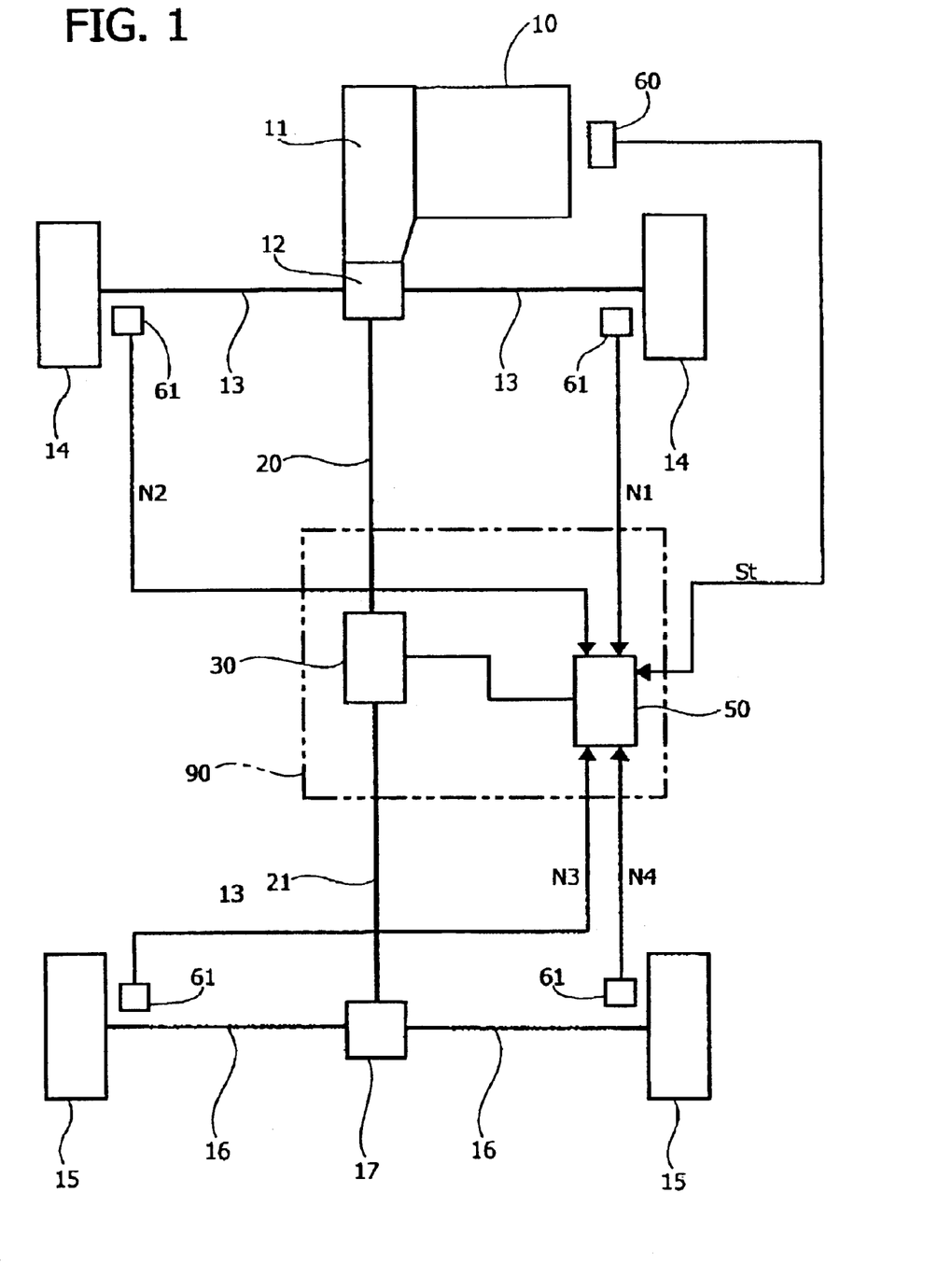
FIG. 1 is a schematic diagram showing a four-wheel-drive vehicle according to a first embodiment of the present invention.

A first embodiment of the present invention will be described with reference to FIGS. 1–4. FIG. 1 is an explanatory view showing a main configuration of a power train of a four-wheel-drive vehicle according to the first embodiment. At a front side of the vehicle, there is installed a transaxle 11 adjacently to an engine 10, into which a transmission, a transfer and a front differential 12 are assembled uniformly. A driving force generated by the engine 10 is transmitted to a pair of front driven shafts 13 from the transmission of the transaxle 11 through the front differential, to drive a pair of front wheels 14. Namely, the driving force is directly transmitted to the front wheels 14, so that the front wheels 14 are always driven thereby.

Further, a front end of a front side propeller shaft 20 is connected with the transmission by the transfer of the transaxle 11 through its gear. On the other hand, rear end of the front side propeller shaft 20 is fixed with an input portion 31 (refer to FIG. 2) of a torque transmission device 30 which is disposed at an intermediate position of the vehicle. Therefore, the input portion 31 of the torque transmission device 30 is always rotated together with the front wheels 14.

On an expansion line of the front propeller shaft 20, there is disposed a rear side propeller shaft 21 so that the torque transmission device 30 is sandwiched between the both propeller shafts 20 and 21. A front end of the rear propeller shaft 21 is fixed with an output portion 32 (refer to FIG. 2). The other rear end of the rear propeller shaft 21 is connected with a rear differential 17. Further, rear wheels are attached onto end portions of rear driven shafts 16 which are provided with the rear differential 17 so as to extend therefrom in left and right directions, respectively. With this configuration, the rear wheels 15 are not always driven by the driving force of the engine 10, but are selectively driven according to operation of the torque transmission device 30.

Besides, the front wheels 14 correspond to "a first set of wheels", while the rear wheels correspond to "a second set of wheels" in the claim descriptions.

Figure 2:
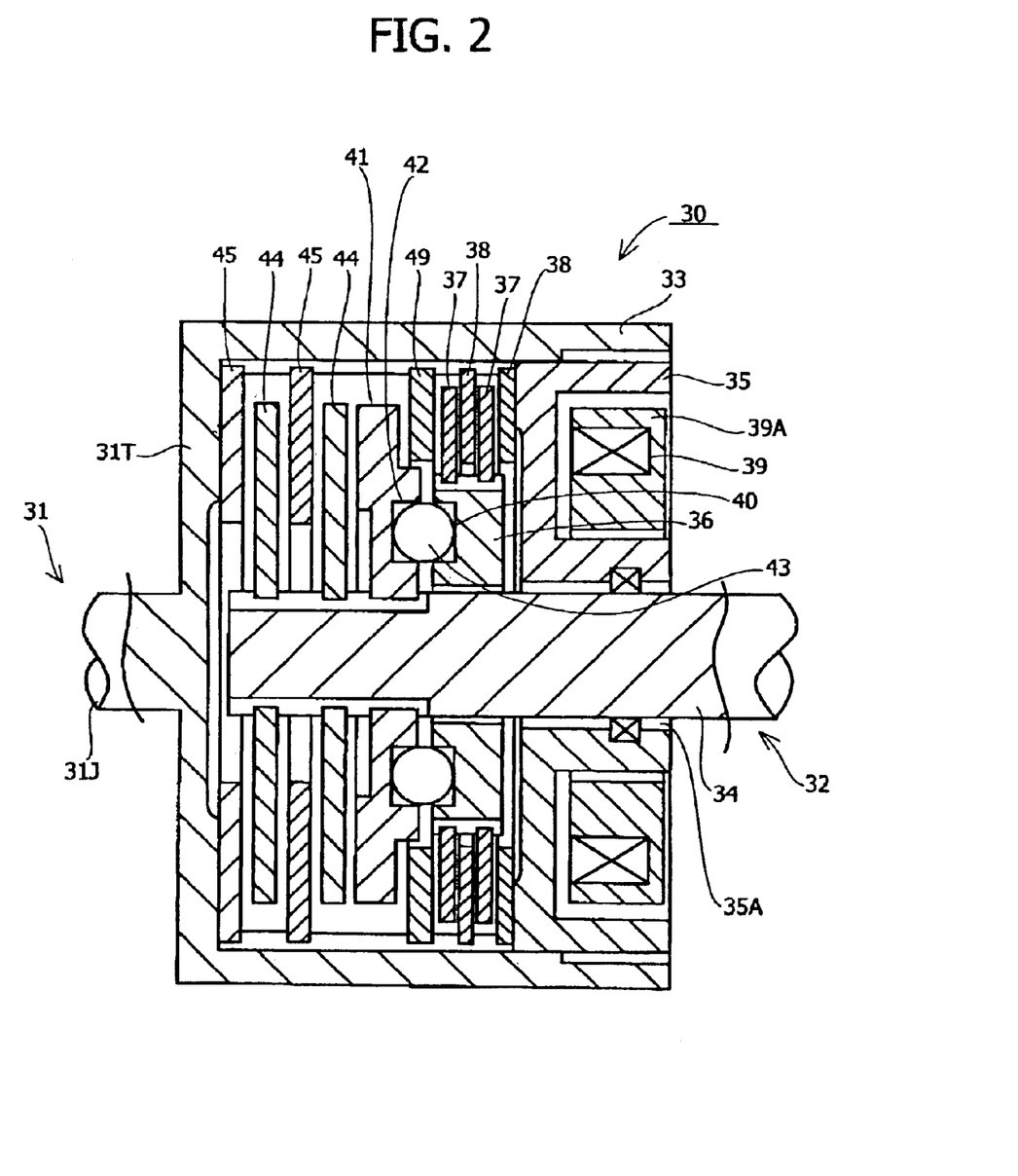
FIG. 2 is a cross-sectional view of a torque transmission device equipped to the four-wheel-drive vehicle of the first embodiment.

FIG. 2 shows a basic construction of the torque transmission device 30.

The input portion 31 of the torque transmission device 30 provides an outer case 33 consisting of a bottom wall 33T and a shaft portion 33J. In the bottomed cylindrical outer case 33, the bottom wall 33T is arranged at the front side, while its opening is provided at the rear side. The front propeller shaft 20 is connected with the shaft portion 33J (refer to FIG. 1). A rear cover 35 is screwedly fitted into the outer case 33 so as to close the opening of the outer case 33. An inner shaft 34 that consists of the output 32 of the torque transmission device is liquid-tightly protruded into a through hole 35A formed in the center of the rear cover 35.

The inner shaft 34 is rotatably supported by the outer case 33 and, is however restricted to move in an axial direction of the inner shaft 34 relative to the outer case 33. One end of the inner shaft 34 extends by the vicinity of the bottom wall 33T of the outer case 33, and the other end of the inner shaft 34 is connected with the rear propeller shaft 21 so as to protrudes from the outside of the torque transmission device 30 (refer to FIG. 1).

A first cam disk 36 is rotatably supported with the inner shaft 34 at a portion close to the rear cover 35 in the outer case 33. Plural ring-shaped inner pilot clutch plates 37 are spline-engaged with a circumferential surface of the first cam disk 36. That is, the inner pilot clutch plates 37 are movable in the axial direction, but is restricted to rotate relative to the first cam disk 36 in a rotational direction. Plural outer pilot clutch plates 38 that are ring-shaped are engaged with the inner surface of the outer case 33 by splines at a portion close to rear cover 35. Therefore, the outer pilot clutch plates 38 are movable in the axial direction, but are restricted to rotate relative to the outer case 33 in the rotational direction. The inner pilot clutch plates 37 and the outer pilot clutch plates 38 are oppposingly disposed from each other alternately of the axial direction. A ring-shaped armature 49 is spline-engaged with the inner surface of the outer case 33 at a position where the rear cover 35 binds the inner pilot clutch plates 37 and the outer pilot clutch plates 38 therewith.

Inside of the outer case 33, an electromagnetic coil 39 is disposed at a rear side of the rear cover 35. The electromagnetic coil 39 is accommodated into an annular groove formed on the front surface of a yoke 39A which is rotatably supported with the rear cover by a bearing (not shown). In a case that the electromagnetic coil 39 is not excited, the inner pilot clutch plates 37 can rotate relatively to the outer pilot clutch plates 38 (referred to as "separated operation"). On the other hand, the armature 49 is attracted toward the rear cover 35 with excitation of the electromagnetic coil 38, the inner pilot clutch plates 37 and the outer pilot clutch plates 38 are attracted to the rear cover 35 together with the armature 49. Therefore, the inner pilot clutch plates 37 are frictionally engaged with the outer pilot clutch plates 38, respectively (referred to as "frictional engage operation"). When the electromagnetic coil 39 is further excited, are further attracted to the outer pilot clutch plates 38. Finally, the inner pilot clutch plates 37 are completely coupled to the outer pilot clutch plates 38 with the furthest excitation of the electromagnetic coil 39 (referred to as "directly coupled operation"). The first cam disk 36 is rotated by torque which is transmitted from the outer case 33 through the frictional engagement or the complete coupling between the inner pilot clutch plates 37 and the outer pilot clutch plates 38. In the claim description, the above described inner pilot clutch plates 37, outer pilot clutch plates 38, electromagnetic coil 39 and armature 49 constitute a pilot clutch mechanism.

Figure 3A:
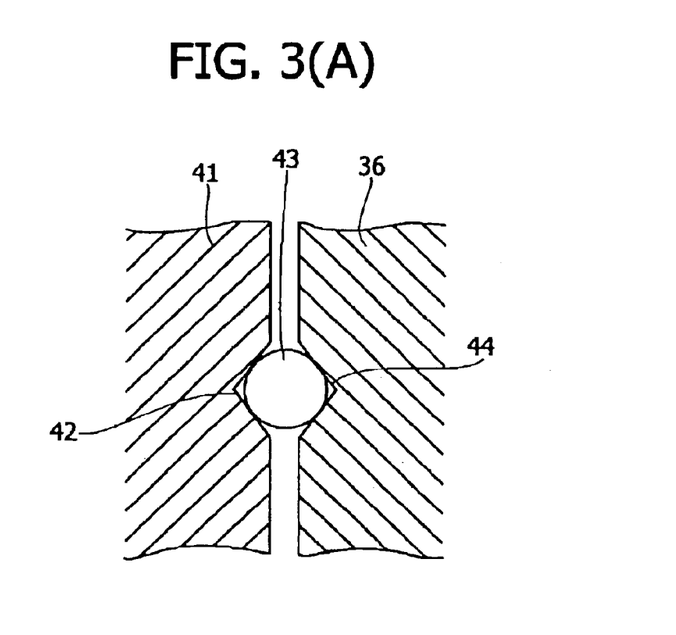
FIG. 3A and FIG. 3B are enlarged cross-sectional views showing a cam mechanism of the torque transmission device.
Figure 3B:
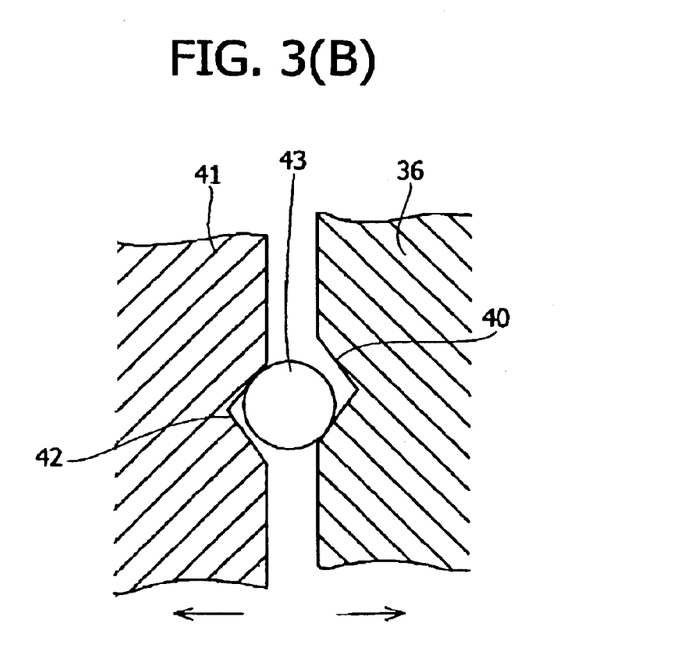

A second cam disk 41 is disposed in front of the first cam disk 36, and is spline-engaged with the inner shaft 34. That is, the second cam disk 41 can move in the axial direction, but its relative rotation to the inner shaft 34 is restricted. Plural V-shaped concavities 40, 42 are symmetrically formed on a front surface (left in FIG. 2 and FIG. 3) of the first cam disk 36 and a rear surface (right in FIG. 2 and FIG. 3) of the second cam disk 41 so as to face with each other, respectively. As shown by FIG. 3(A) that is a cross-sectional view in the circumferential direction of the first cam disk 36 and the second cam disk 41, each V-shape concavity 40, 42 is concaved so as to become gradually deep toward the center of the V-shape concavity 40, 42 in its circumferential direction (vertical direction in FIG. 3(A)). Plural cam balls 43 are held corresponding to between the V-shape concavities 40 of the first cam disk 36 and the V-shape concavities 42 of the second cam disk 41, respectively. When the first cam disk 36 is rotated relative to the second cam disk 41, each cam ball 43 moves to a shallow position of both V-shape concavities 40, 42. As a result, such a force occurs that makes the first cam disk 36 and second cam disk 41 be away from each other. In the claim description, the above described first cam disk 36, second cam disk 38 and cam balls 43 constitute a cam mechanism.

As shown in FIG. 2, plural ring-shaped inner main clutch plates 44 are disposed in the outer case 33 more forward than the second cam disk 41 to spline-engaged with the outer surface of the inner shaft 34. That is, the inner main clutch plates 44 can move in the axial direction, but the relative rotation of the inner clutch plates 44 to the inner shaft 34 can be restricted. Plural ring-shaped outer main clutch plates 45 are spline-engaged with the inner surface of the outer case 33. That is, the outer main clutch plates 45 can move in the axial direction, but the relative rotation of the outer main clutch plates 45 to the outer case 33 can be restricted. The inner main clutch plates 44 and the outer main clutch plates 45 are disposed alternately to face from each other. In a case that the second cam disk 42 does not move toward the bottom wall 33T, the inner main clutch plates 44 can rotate relatively to the outer main clutch plates 45. On the other hand, the second cam disk 42 is moved forward by the magnetic attraction of the electromagnetic coil 39, the second cam disk 42 pushes the inner main clutch plates 44 and the outer main clutch plates 45 to the side of the bottom wall 33T (to the left in FIG. 2). As a result of pushing, the inner main clutch plates 44 and the outer main clutch plates 45 are frictionally engaged with each other, so that the torque can be transmitted from the outer case 33 to the inner case 34 through the inner main clutch plates 44 and the outer main clutch plates 45. In the magnetic attraction of the electromagnetic coil 39 becomes further large due to further excitation thereof, the pushing force of the second cam disk 41 is further increased, so that the inner main clutch plates 44 and the outer main clutch plates 45 are completely coupled. In the claim description, the above described inner main clutch plates 44 and outer main clutch plates 38 constitute a main clutch mechanism.

The aforementioned torque transmission device 30 can selectively take three different states. One of state is "separate state" which no torque is transmitted from the input portion 31 to the output portion 32 (i.e., the input portion 31 are freely rotatable relatively to the output 32). Another state is "intermediate state" which a part of torque is transmitted from the input 31 to the output 32 (i.e., the rotational difference between the input portion 31 and output portion 32 can be permitted. The other state is "complete coupling state", which all torque of the input portion 31 is completely transmitted to the output portion 32 (i.e., the input 31 can rotated with the output portion 32).

The electromagnetic coil 39 is controlled by an ECU (electronic control unit) 50. Besides, a driving force distribution control system 90 according to the present invention is composed of the torque transmission device 30 and the ECU 50, as shown in FIG. 1.

The ECU 50 controls quantity of current supplied to the electromagnetic coil 39 in order to adjust torque that is transmitted through the torque transmission device 30. As shown by FIG. 1, throttle-opening degree signal St representing a degree of throttle opening of the engine 10 which is detected by a throttle sensor 60 is inputted to the ECU 50. To the ECU 50, there are also inputted front wheel speed signals N1, N2 representing rotational speed of each front wheel 14 and rear wheel speed signals N3, N4 representing rotational speed of each rear wheel 15 which are respectively detected by rotational speed sensors 61.

Figure 4:
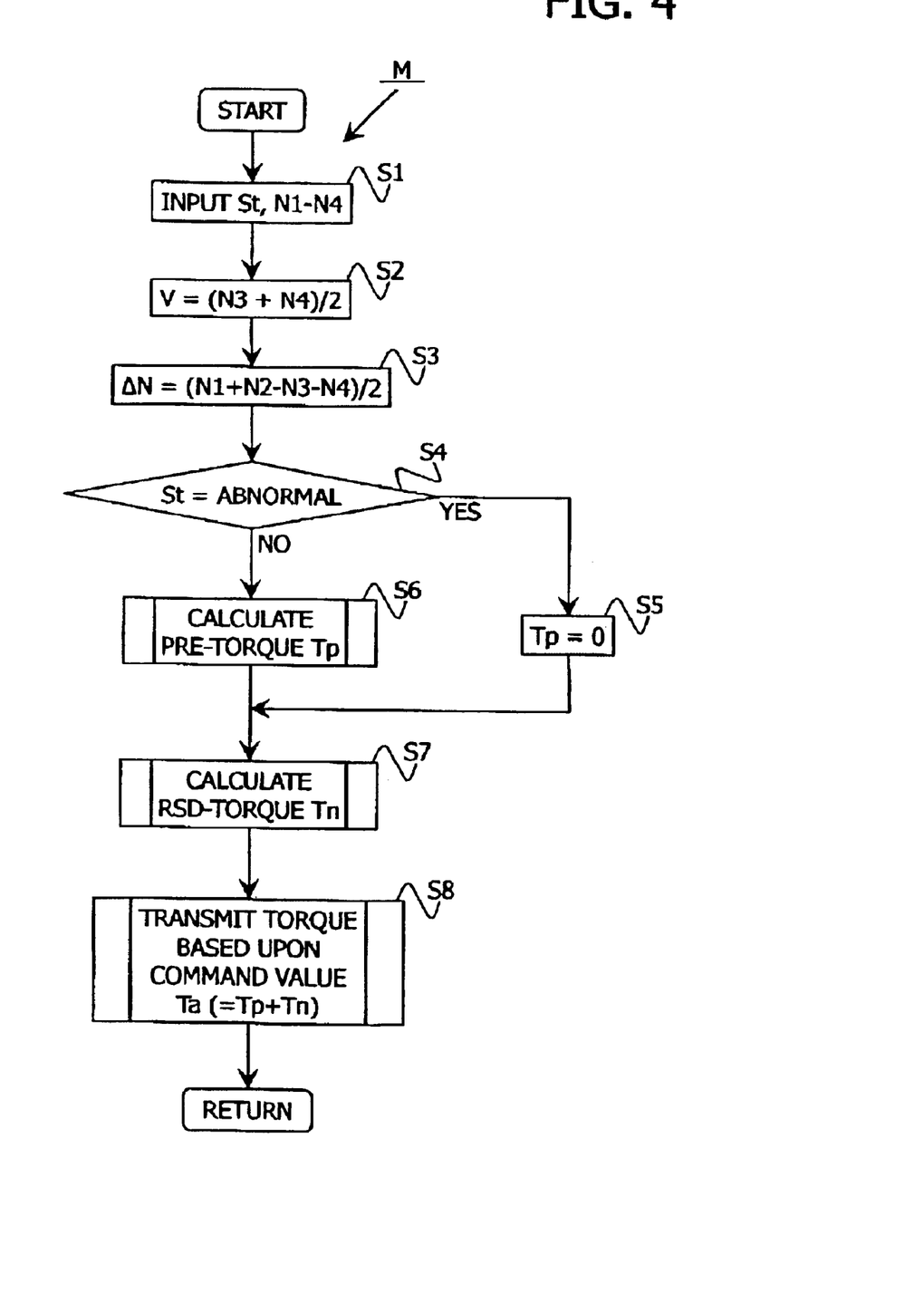
FIG. 4 is a flowchart of a main program that is executed by an electric control unit for the torque transmission device.

The ECU 50 reads out a main program M shown by FIG. 4 from a ROM (not shown) to execute at a predetermined time interval period. First, the ECU 50 receives the throttle-opening signal St from the throttle sensor 60 and the wheel speed signals N1–N4 from the rotational speed sensors 61 (in step S1). A vehicle speed V is calculated based on the wheel speeds N1–N4 (in S2). It is preferable that The vehicle speed V is calculated as an average value of the wheel speeds N3 and N4 of the both rear wheels 15. Because the rear wheels 15 generally intend to slip compared with the front wheels 14 in a case that the front wheels 14 are always driven and the rear wheels 15 are not always driven.

$$V=(N3+N4)/2$$

Next, a rotational speed difference $\Delta N$ between the front wheels 14 and the rear wheels 15 is calculated based on the wheel speeds N1–N4 as a difference between an average value of the wheel speeds (N1, N2) of the front wheels 14 and an average value of that (N3, N4) of the rear wheels 15 (in step S3).

$$\Delta N=(N1+N2)/2-(N3+N4)/2=(N1+N2-N3-N4)/2$$

In next step, it is judged whether the throttle-opening degree signal St is abnormal or not (in step S4). In other words, it is judged whether the throttle-opening degree signal St exists within a predetermined range or not. When the throttle-opening degree signal St exists within a predetermined lower limit C1 and a predetermined upper limit C2 in the predetermined range, it is judged that the throttle-opening degree signal St is normal. Concretely, it is requested to satisfy the following expression.

$$C1 = m = C2$$

On the other hand, it is judged that the throttle-opening degree signal St is abnormal when the throttle-opening degree signal St is out of the predetermined range, i.e., when the above-mentioned expression is not satisfied.

Herein, in a case that it is judged that the throttle-opening degree signal St is not abnormal (S4=No), a pre-torque Tp corresponding to a first torque command of the claim description is obtained from the throttle-opening degree signal St and the vehicle speed V (in step S6). The pre-torque Tp is obtained by referring to a map that is stored in the ROM and defines values of the pre-torque Tp according to the throttle-opening degree signal St and the vehicle speed V. For example, the map in the form of a three-dimension defines values of the pre-torque Tp so as to increase according to the increase of the throttle-opening degree signal St in a state that the vehicle speed V is less than a predetermined speed, while the map defines it so as to be constant independent of the throttle-opening degree signal St in a state that the vehicle speed V is larger than the predetermined speed. On the other hand, when it is judged that the throttle-opening degree signal St is abnormal. (S4=Yes), the pre-torque Tp is set to be zero in its value. Sequentially, a torque relative to a rotational speed difference torque (referred to as "RSD-torque" hereinafter) Tn corresponding to a second torque command of the claim description is obtained from the rotational speed difference $\Delta N$ and the vehicle speed V (in step S7). The RSD-torque Tn is obtained by referring a map that is stored in the ROM and defines values of RSD-torque according to the rotational speed difference $\Delta N$ and the vehicle speed V (in step S7). For example, the map in the form of a three-dimension defines the values of the RSD-torque Tn so as to increase according to the increase of the rotational speed difference $\Delta N$ in a state that the vehicle speed V is less than a predetermined speed, but a proportion of the increase of the values of the RSD-torque Tn decreases according to the increase of the vehicle speed V in a state that the vehicle speed V is larger than the predetermined speed. Finally, an actual torque command Ta is calculated by the sum of the pre-torque Tp and the RSD-torque Tn, and a current value supplied to the electromagnetic coil 39 is controlled so that the torque transmission device 30 transmits from the input portion 31 to the output portion 32 the torque according to the actual torque command Ta (in step S8).

$$Ta=Tp+Tn$$

Namely, the torque transmission device 30 is controlled corresponding to the pre-torque Tp and the RSD-torque Tn when the throttle-opening degree signal St is normal, while it is controlled corresponding to only the RSD-torque Tn when the throttle-opening degree signal St is abnormal.

According to the above-described four-wheel-drive vehicle, the throttle-opening degree signal St corresponding to how much a driver presses a throttle pedal is always detected by the throttle sensor 30 while the vehicle travels. The throttle-opening degree signal St is inputted to the ECU 50. The torque transmission device 30 is usually controlled corresponding to the pre-torque Tp and the RSD-torque (referred to as "a normal control mode" hereinafter). Then, the torque transmission device 30 is controlled according to the pre-torque Tp mainly under a state that the vehicle runs normally, because the rotational speed difference $\Delta N$ is small or zero. Under a state that a wheel spin happens because of a rough road such as snowy road, since the rotational speed difference $\Delta N$ between the front wheels 14 and the rear wheels 15 increases, effect of the RSD-torque Tn to occupy in the actual torque command Ta increases. As a result, the torque transmitted to the rear wheels 15 through the torque transmission device 30 increases. Therefore, the wheel slip is prevented.

Meanwhile, it happens that the throttle-opening degree signal St becomes to be abnormal because of a failure of the throttle sensor 60, a wire breaking or effect of some noise. Then, since the throttle-opening degree signal St becomes to be out of the predetermined range, the pre-torque Tp is made zero. Therefore, the torque transmission device 30 is controlled according to only the RSD-torque Tn (referred to as "a RSD control mode" hereinafter). Even if the throttle-opening signal degree St becomes to be abnormal when the vehicle travels on the rough road, since the torque transmission device 30 is controlled according to the RSD-torque Tn, the vehicle can run on the rough road in accordance with the RSD command mode. That is, if a wheel spin happens, since the rotational speed difference ΔN increases, the RSD-torque Tn increases. As a result, torque transmitted to the rear wheels 15 through the torque transmission device 30 increases. Therefore, the wheel slip is prevented. In a case that cause of the abnormality is, for example, temporary disconnection, the throttle-opening degree signal St returns to be a normal state immediately. Then, the control of the torque transmission device 30 can be returned to the normal control mode.

According to the first embodiment of the present invention, even if the throttle-opening degree signal St becomes to be abnormal, the vehicle can retain function as four-wheel-drive vehicle.

[Second Embodiment]

Since the second embodiment is same as the first embodiment except that a main program M' is used for the second embodiment instead of the main program M in the first embodiment, description for other constructions are omitted.

Figure 5:
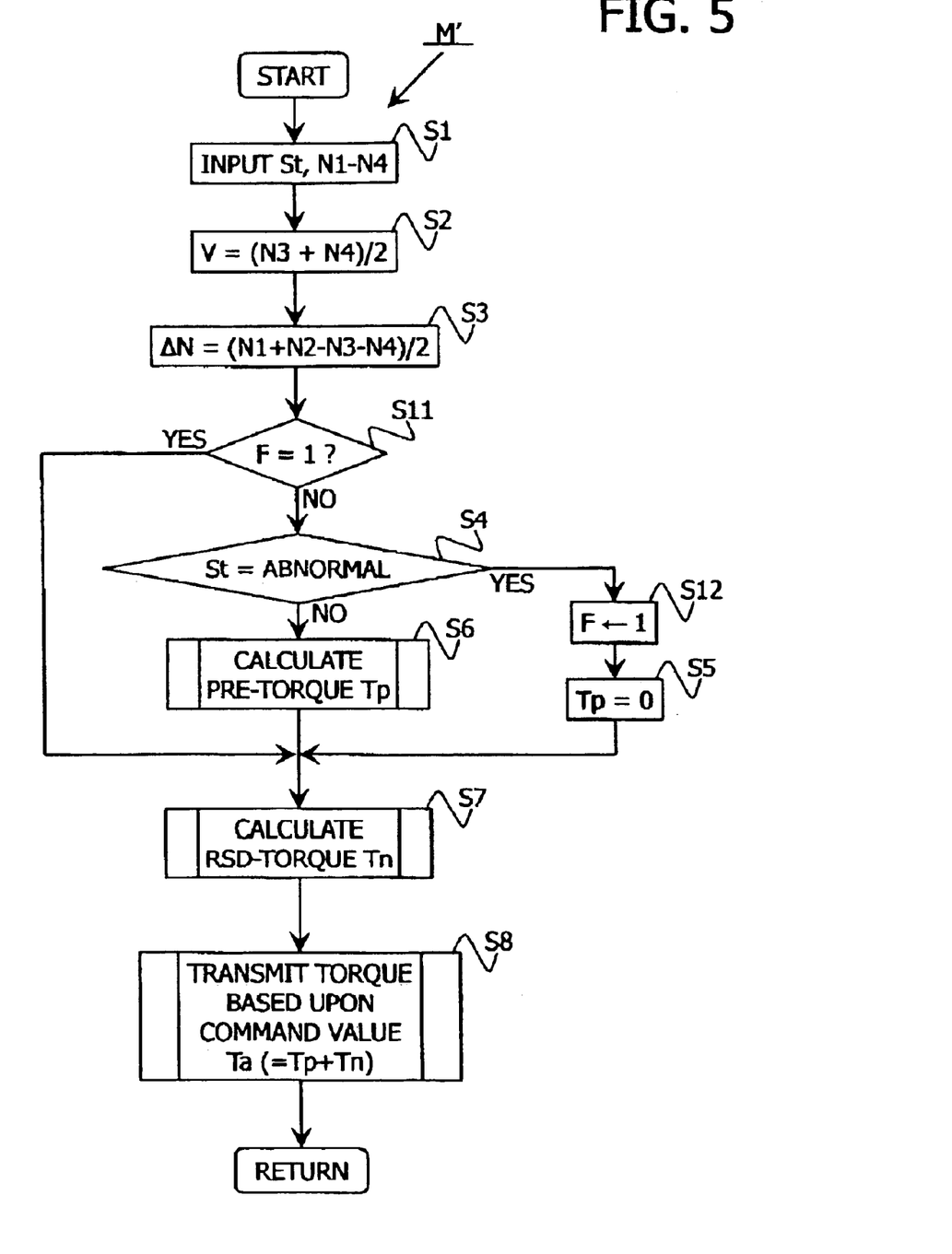
FIG. 5 is a flowchart of a main program for a second embodiment of the present invention.

In the second embodiment, even if the abnormality of the throttle-opening degree signal St returns to be a normal state, the control of the torque transmission device 30 does not return to the normal control mode immediately. In the main program M' shown by FIG. 5, step (S11) for judging whether a flag F is one (active) or not is disposed in front of step (S4) for judging whether the throttle-opening signal degree St is or not the abnormal state. The flag F is set as zero initially just after an ignition is turned on, for example. The flag F keeps one (active), if it is set to one once unless the driver presses a reset button arranged in a cabin of the vehicle. In other words, the flag F is initialized to be zero when the reset button is turned. Therefore, while the flag F is zero, the torque transmission device 30 is controlled similar to that of the first embodiment. That is, since the judgement in S11 is No, the process advances to S4. If the throttle-opening degree signal is normal, the torque transmission device 30 is controlled in the normal control mode in S6 to S8. On the other hand, when the abnormality of the throttle-opening degree signal St happens (S4=Yes), the flag F is set to one (in S12). The torque transmission device 30 is controlled according to only the RSD-torque Tn similar to that of the first embodiment. Since the flag F is set to one, the RSD control mode is kept even if the throttle-opening degree signal St returns to the normal.

According to the second embodiment of the present invention, even if the throttle-opening degree signal St is hunted between the normal and the abnormality, it is prevented that the normal control mode and the RSD control mode are repeatedly changed. Therefore, the vehicle is controlled stably.

[Third Embodiment]

Since a third embodiment is same as the first embodiment except that a main program M'' is used for the third embodiment instead of the main program M in the first embodiment, description for other constructions are omitted.

Figure 6:
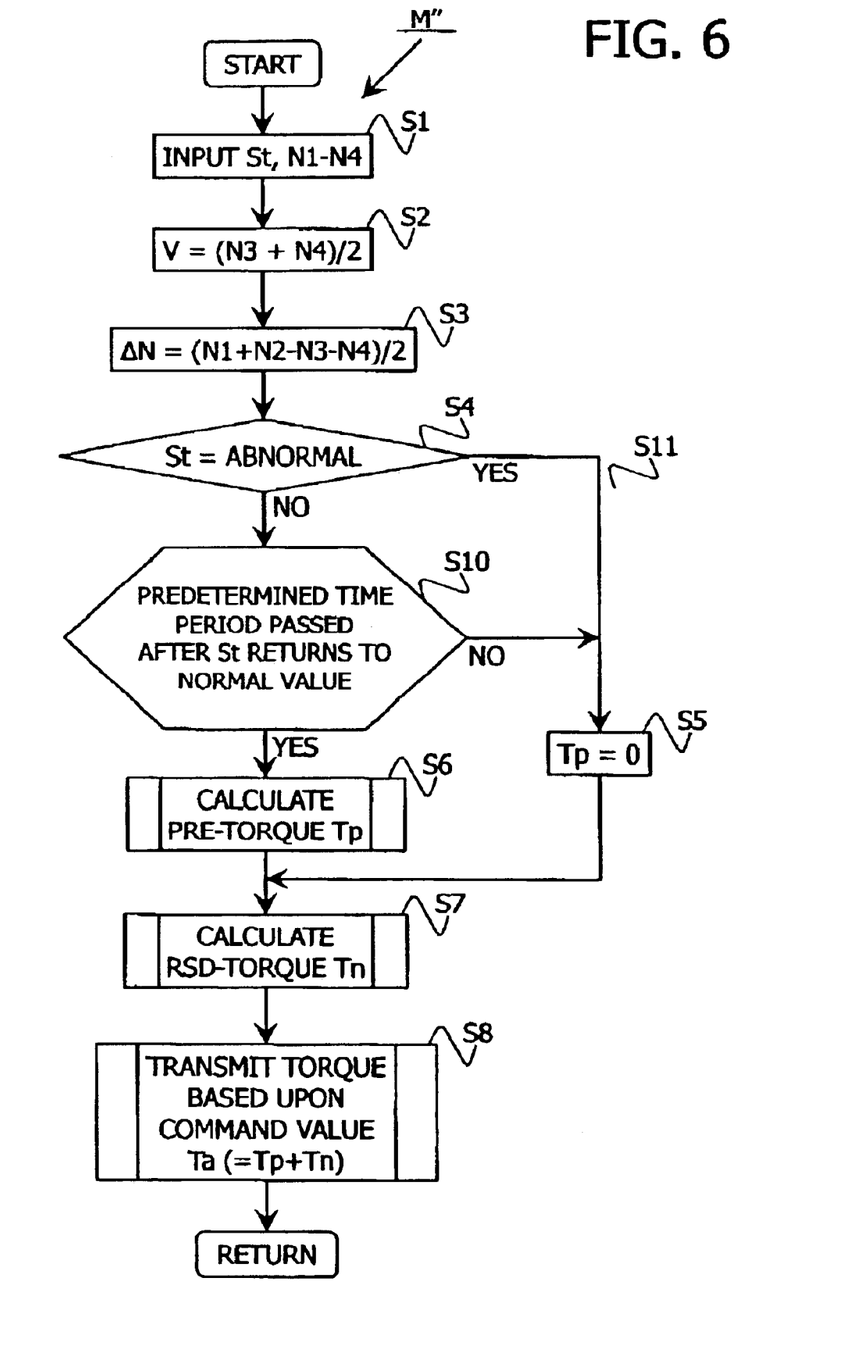
FIG. 6 is a flowchart of a main program for a third embodiment of the present invention.

Similar to the second embodiment, even if the abnormality of the throttle-opening degree signal St returns to a normal state, the control of the torque transmission device 30 does not return to the normal control mode immediately in the third embodiment. In the main program M'' shown by FIG. 6, step (S10) judging whether a predetermined time passes or not after the throttle-opening degree signal St returned to the normal state is disposed between step (S4) for judging the abnormality of the throttle-opening degree signal St and step (S6) for calculating the pre-torque Tp. When the throttle-opening degree signal St becomes an abnormality, a software timer is started It is judged whether a value of the timer exceeds the predetermined time or not in step (S10). The value of the timer is initially set as a larger value than the predetermined value, because it prevents that the pre-torque Tp is set to zero in step (SS) at the first scan of the main program M'' after the ignition is turned on.

According to the third embodiment, if the throttle-opening degree signal St becomes the abnormality once, the control of the torque transmission device 30 is not returned to the normal control mode unless it passes the predetermined time after the throttle-opening signal degree St returns to the normal. Therefore, it is prevented that the normal control mode and the RSD control mode are repeatedly changed in a short period. Therefore, the vehicle is controlled stably. In addition, the reset button is not needed in comparison with the second embodiment.

[Modifications]

The front wheels 14 are always driven and the rear wheels 15 are selectively driven in the first, second and third embodiments. However, the present invention can be also applied to a four-wheel-drive vehicle that the rear wheels 16 are always driven and the front wheels 15 are selectively driven.

The abnormality of the throttle-opening degree signal St is judged according to whether the throttle-opening degree signal St is in the predetermined range in the first, second and third embodiments. However, other ways can be applied to judge the abnormality of the throttle-opening degree signal St. For example, it is possible that the abnormality of the throttle-opening degree signal St is judged by using lengths of its drift cycle. Further, in a case that the throttle-opening degree signal St is serial signal, it is possible that the abnormality is judged by whether the serial signal is received or not during a predetermined receiving cycle.

The RSD-torque Tn is calculated by the same way, i.e., by using the same map, in both of the normal control mode and the RSD control mode in the first, second and third embodiments. However, different way or different map can be applied. Further, a value that is obtained so as to multiply the RSD-torque calculated as same way with the normal control mode by some gain can be used as RSD-torque in the RSD control mode.

Obviously, numerous modifications and variations of the present invention are possible in light of the above teachings. It is thereby to be understood that within the scope of the appended claims, the present invention may be practiced otherwise than as specifically described herein.

What is claimed is:

1. A driving force distribution control method for a four-wheel-drive vehicle having a torque transmission device configured to distribute torque transmitted from an engine to a first set of wheels directly driven and to a second set of wheels driven therethrough, the control method comprising the steps of:

detecting throttle-opening of the engine;

obtaining a first torque command which depends on the throttle-opening;

detecting a rotational speed difference between the first set of wheels and the second set of wheels;

obtaining a second torque command which depends on the rotational speed difference;

controlling the torque transmission device based on the first torque command and the second torque command so as to transmit the driving force to the second set of wheels according to the throttle-opening and the rotational speed difference; and monitoring a signal which corresponds to the throttle-opening, wherein when the signal is judged being abnormal, the first torque command is ignored so that the torque transmission device is controlled based on the second torque command.

2. A driving force distribution control method according to claim 1, wherein when the signal returns to normal, the ignoring the first torque command is cancelled so that the torque transmission device is controlled based on the first torque command and the second torque command.

3. A driving force distribution control method according to claim 2, wherein the ignoring the first torque command is cancelled when a reset button is pressed after the signal returns to normal.

4. A driving force distribution control method according to claim 2, wherein the ignoring the first torque command is cancelled when a predetermined time passes after the signal returns to normal.

5. A driving force distribution control method according to claim 1, wherein the first set of wheels is front wheels and the second set of wheels are rear wheels of the four-wheels-drive vehicle.

6. A driving force distribution control method according to claim 1, wherein the first set of wheels is rear wheels and the second set of wheels are front wheels of the four-wheels-drive vehicle.

7. A driving force distribution control method according to claim 1, wherein when a value of the signal becomes out of a predetermined range, the signal is judged to be abnormal.

8. A driving force distribution control method according to claim 1, wherein when a length of drift cycle of the signal becomes shorter than a predetermined length, the signal is judged to be abnormal.

9. A driving force distribution control method according to claim 1, wherein when the signal is not received during a predetermined period, the signal is judged to be abnormal.

10. A driving force distribution control method according to claim 1, wherein vehicle speed of the four-wheel-drive vehicle is calculated based on at least one rotational speed of the first set of wheels and the second set of wheels, and the first torque command depends on not only the throttle-opening but also and the vehicle speed.

11. A driving force distribution control method according to claim 10, wherein the first torque command is obtained by using a first map which describes a relationship between torque transmitted to the second set of wheels, the throttle-opening the vehicle speed.

12. A driving force distribution control method according to claim 1, wherein vehicle speed of the four-wheel-drive vehicle is calculated based on at least one rotational speed of the first set of wheels and the second set of wheels, and the second torque command depends on not only the rotational speed difference but also the vehicle speed.

13. A driving force distribution control method according to claim 12, wherein the second torque command is obtained by using a second map which describes a relationship between torque transmitted to the second set of wheels, the rotational speed difference and the vehicle speed.

14. A driving force distribution apparatus for a four-wheel-drive vehicle having a torque transmission device configured to distribute torque transmitted from an engine to a first set of wheels driven directly and to a second set of wheels driven therethrough, the apparatus comprising:

a throttle sensor detecting throttle-opening degree of the engine;

plural speed sensors detecting rotational speed of the first set of wheels and the second set of wheels;

an electrical control unit controlling the torque transmission device, wherein the electrical control unit determines a first torque command which depends on the throttle-opening detected by the throttle sensor and a second torque command which depends on a rotational speed difference between the first set of wheels and the second set of wheels detected by the each speed sensor, the electrical control unit controls the torque transmission device based on the first torque command and the second torque command so as to transmit the driving force to the second set of wheels according to the throttle-opening and the rotational speed difference, and the electrical control unit monitors a signal which is detected by the throttle sensor, and when the signal judged being abnormal the first torque command is ignored so that the torque transmission device is controlled based on the second torque command.

15. A driving force distribution apparatus according to claim 14, wherein the torque transmission device comprises:

a main clutch mechanism to transmit the torque to the second set of wheels, a cam mechanism to operate the main clutch mechanism, and a pilot clutch mechanism to operate the cam mechanism based on the first torque command and the second torque command.

16. A driving force distribution apparatus for a four-wheel-drive vehicle having a torque transmission device configured to distribute torque transmitted from an engine to a first set of wheels to a second set of wheels, the apparatus comprising:

throttle sensing means for detecting throttle-opening of the engine;

rotational speed sensing means for detecting rotational speed of the first set of wheels and the second set of wheels;

control means for controlling the torque transmission device, wherein the control means determines a first torque command which depends on the throttle-opening detected by the throttle sensing means and a second torque command which depends on a rotational speed difference between the first set of wheels and the second set of wheels detected by the rotational speed sensing means, the control means controls the torque transmission device based on the first torque command and the second torque command so as to transmit the driving force to the second set of wheels according to the throttle-opening and the rotational speed difference, and the control means monitors a signal which is detected by the throttle sensor, and when the signal judged being abnormal the first torque command is ignored so that the torque transmission device is controlled based on the second torque command.

17. A driving force distribution apparatus according to claim 16, wherein the torque transmission device comprises:

main clutch means for transmitting the torque to the second set of wheels;

cam means for operating the main clutch means; and pilot clutch means for operating the cam means based on the first torque command and the second torque command.

* * * * *